United States Patent
Schreter (10) Patent No.: US 10,810,124 B2
(45) Date of Patent: *Oct. 20, 2020

(54) DESIGNATIONS OF MESSAGE-PASSING WORKER THREADS AND JOB WORKER THREADS IN A PHYSICAL PROCESSOR CORE

(71) Applicant: SAP SE, Walldorf (DE)

(72) Inventor: Ivan Schreter, Walldorf (DE)

(73) Assignee: SAP SE, Walldorf (DE)

( * ) Notice: Subject to any disclaimer, the term of this patent is extended or adjusted under 35 U.S.C. 154(b) by 388 days.

This patent is subject to a terminal disclaimer.

(21) Appl. No.: 15/810,442

(22) Filed: Nov. 13, 2017

(65) Prior Publication Data

US 2018/0067859 A1 Mar. 8, 2018

Related U.S. Application Data

(63) Continuation of application No. 14/690,774, filed on Apr. 20, 2015, now Pat. No. 9,842,052.

(51) Int. Cl.
*G06F 9/46* (2006.01)
*G06F 12/0846* (2016.01)
*G06F 9/52* (2006.01)
*G06F 9/54* (2006.01)
*G06F 12/0895* (2016.01)

(52) U.S. Cl.
CPC ........... *G06F 12/0848* (2013.01); *G06F 9/52* (2013.01); *G06F 9/544* (2013.01); *G06F 12/0895* (2013.01); *G06F 2212/1021* (2013.01); *G06F 2212/282* (2013.01); *G06F 2212/604* (2013.01); *G06F 2212/608* (2013.01)

(58) Field of Classification Search
None
See application file for complete search history.

(56) References Cited

U.S. PATENT DOCUMENTS

| 7,831,772 | B2 | 11/2010 | Nalawade | |
|---|---|---|---|---|
| 8,401,994 | B2 | 3/2013 | Hoang | |
| 9,009,203 | B2 | 4/2015 | Schreter | |
| 9,600,551 | B2 | 3/2017 | Schreter | |
| 9,842,008 | B2 * | 12/2017 | Kimmel | G06F 9/5088 |
| 2011/0231447 | A1 * | 9/2011 | Starkey | G06F 16/27 707/792 |
| 2015/0052314 | A1 | 2/2015 | Fuji | |

* cited by examiner

*Primary Examiner* — Bing Zhao
(74) *Attorney, Agent, or Firm* — Mintz Levin Cohn Ferris Glovsky and Popeo, P.C.

(57) ABSTRACT

A central processing unit (CPU) forming part of a computing device, initiates execution of code associated with each of a plurality of objects used by a worker thread. The CPU has an associated cache that is split into a plurality of slices. It is determined, by a cache slice allocation algorithm for each object, whether any of the slices will be exclusive to or shared by the object. Thereafter, for each object, any slices determined to be exclusive to the object are activated such that the object exclusively uses such slices and any slices determined to be shared by the object are activated such that the object shares or is configured to share such slices.

12 Claims, 6 Drawing Sheets

DESIGNATIONS OF MESSAGE-PASSING WORKER THREADS AND JOB WORKER THREADS IN A PHYSICAL PROCESSOR CORE

CROSS-REFERENCE TO RELATED APPLICATIONS

This application claims priority to and is a continuation of U.S. patent application Ser. No. 14/690,774, filed on Apr. 20, 2015 and entitled "Selective Allocation of CPU Cache Slices to Database Objects," the disclosure of which is incorporated herein by reference in its entirety.

TECHNICAL FIELD

The subject matter described herein relates to computing and processing operations, for example computing and processing operations relating to database management frameworks in which a central processing unit (CPU) has multiple cache slices that can be selectively used to cache data of plurality of objects assigned to one CPU.

BACKGROUND

Access to shared data structures, for example in a database management system, can generally be implemented either through locking or message-passing. In a locking approach, exclusive access to shared data is given to a thread that is currently acting on the data structure. Other threads needing access to that data structure are required to wait.

Many currently available software programs are written and optimized for execution on a single central processing unit (CPU) or perhaps more than one but relatively few CPU physical cores in a procedural approach that includes synchronization via locks and deep call stacks. Procedural programming approaches generally include use of procedures (e.g. routines, subroutines, methods, functions, etc.) containing a series of computational steps to be carried out as part of one or more operations to be performed on one or more data structures. Procedural programming can be considered as a list of operations for the CPU to perform in a linear order of execution, optionally with loops, branches, etc. Locks are a type of synchronization mechanism for enforcing limits on access to a resource in an environment where there are many threads of execution. A lock enforces a mutual exclusion concurrency control policy, for example to ensure that correct results for concurrent operations are generated as quickly as possible.

In contrast, approaches for heavily parallelized operation more typically employ message-passing, in which multiple CPU cores communicate over fast interconnect channels (e.g. in a same machine or between two or more discrete machines). In message-passing, a requestor sends a message (which can, for example, include data structures, segments of code, raw data, or the like) to a designated message-passing worker, and the message-passing worker executes code associated with the message (for example, based on message type) which in turn may generate further messages or generate a return message (which can, for example, include an operated-on data structure, segment of code, raw data, or the like). Processes can be synchronized in this manner, for example by requiring that a process wait for receipt of a message before proceeding. In case of message-passing, the worker executing the process does not actually wait, but rather processes further messages. The process effectively resumes once the reply message is received and starts processing. The code for processing a single message in a message-passing arrangement is generally lock-free and uses a very shallow stack. A lock-free algorithm (also referred to as a non-blocking algorithm) ensures that threads competing for a shared resource do not have their execution indefinitely postponed by mutual exclusion.

Generally speaking, a stack is a section of memory used for temporary storage of information. Message-passing approaches generally provide superior performance to procedural code, for example because data are properly partitioned and no additional synchronization besides message queues is generally required. Message-passing operations can be performed by a message-passing worker, which, as used herein, is intended to refer to a type of thread or other operator for performing a set of instructions that implement a message-passing approach.

Performance problems can also manifest when the number of worker threads is limited while, at the same time, the number of objects can be much larger. Such an arrangement often results in a worker thread being assigned several objects. However, when a worker thread frequently switches between two or more objects to process, the CPU cache can be thrashed, thereby causing performance to degrade or collapse.

SUMMARY

In one aspect, a central processing unit (CPU) forming part of a computing device, initiates execution of code associated with each of a plurality of objects used by a worker thread. The CPU has an associated cache that is split into a plurality of slices. It is determined, by a cache slice allocation algorithm for each object, whether any of the slices will be exclusive to or shared by the object. Thereafter, for each object, any slices determined to be exclusive to the object are activated such that the object exclusively uses such slices and any slices determined to be shared by the object are activated such that the object shares or is configured to share such slices.

The CPU can include a bitmask in a register that identifies portions of the cache corresponding to each of the slices to be used by the currently executing thread.

The cache slice algorithm can implement load balancing amongst the plurality of objects. The cache slice algorithm can implement load balancing amongst a plurality of concurrently executing workers.

The shared slices can be shared by different objects associated with the same worker.

The cache slice allocation algorithm can give priority to exclusive use of slices for objects designated as being hot over objects designated as being cold.

The cache slice algorithm can give at least one object solely exclusive access to one or more slices. In some variations, the cache slice algorithm can give at least one object solely shared access to one or more slices. In other variations, the cache slice algorithm can give at least one object both exclusive access to one or more slices and shared access to one or more different slices.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter provides more efficient processing for worker threads having multiple objects while, at the same time, avoiding thrashing of the CPU cache. The current subject matter is also advantageous in that allows better cache usage, because ideally, one object is processed by one thread and thus any control structures (such as metadata, anchor pointers, etc.) are hot in the cache.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Use of message-passing for at least for some operation types in data processing applications can be desirable. Use of message-passing for all operations in a complicated database management framework may not be immediately possible, in particular in cases whether a large amount of legacy code would need to be rewritten to implant such an approach. However, proper resource distribution can be a non-trivial concern in systems or groups of interconnected systems in which both procedural coding approaches and message-passing approaches are used. For example, assigning or reserving one or more physical processor cores for use in implementing a message-passing worker can require that those physical processor cores be made unavailable for other processing tasks. Accordingly, performance of procedural code, in particular parallelized procedural code executing concurrently, can be negatively affected.

Implementations of the current subject matter describe techniques, methods, systems, articles or manufacture, and the like that can allow procedural approaches and message-passing approaches to coexist on modern computing architectures while maintaining satisfactory resource distribution. For example, some modern computer processors (e.g. central processing units or the like) are capable of simultaneous multi-threading (SMT) operations, which is also referred to as hyper-threading. Using SMT, for each available physical processor core, the operating system addresses two or more virtual or logical cores, and shares the workload between them when possible. Two or more threads being executed by the two or more logical cores share the physical processor core's resources, but each have their own registers. Registers are not a part of a stack, but rather an internal state of the CPU. A program uses the stack to store spilled-out CPU registers if there are not sufficient registers available and to store registers of the caller routine.

Registers are used by the physical processor core when it runs a particular thread. When processing is switched between a first thread and a second thread (for example by a program, operating system, etc., the current values of a thread's register is saved into an area of system memory specific to the first thread. Values in any previously saved register for the second can be loaded prior to running of the second thread in a context switch. Simultaneous multi-threading can improve performance of a physical processor core in certain situations, for example by facilitating use of resources for other operations when a first thread is currently stalled or not making full use of the available resources of the physical processor core. An advantage provided by SMT is to decrease the number of dependent instructions on the pipeline, for example through use of superscalar architectures which enable multiple instructions to operate on separate data in parallel. The two or more logical cores can appear to an operating system or application as two or more processors, so the operating system or application can schedule two or more processes at once. In addition two or more processes can use the same resources. If one process fails then the resources can be readily re-allocated. In some examples, a performance improvement of as much as 10-30% relative to a comparable physical processor core not using SMT is generally achievable depending on the nature of the operations being performed by the physical processor core.

Consistent with implementations of the current subject matter, at least some of the logical cores provided by a physical processor core are designated or assigned for running message-passing workers while the remaining logical cores are designated for running executable code. In an example, a SMT-capable physical processor core supports two logical cores. Other examples with more than two logical cores per physical processor core are also with the scope of the current subject matter. A first logical core of a physical processor core can be designated for use by a message-passing worker while another logical core of that physical processor core can be designated for execution of procedural code. A message queue and a set of database objects are associated with a particular message-passing worker. In other words, a message queue and set of database objects are designated to be processed by a specific message-passing worker. Any operation needed for a specific database object is designated for execution by (and, for example, delivered to) the associated message-passing worker. Using such an approach, even a processing workload that is heavily skewed to either message-passing operations or to procedural code-based operation can typically lose no more than 9-24% performance against using all logical cores for a single type of workload. In case the CPU core supports more than two parallel threads, a different logical core assignment scheme is possible, based on expected processing workload distributions.

Figure 1:
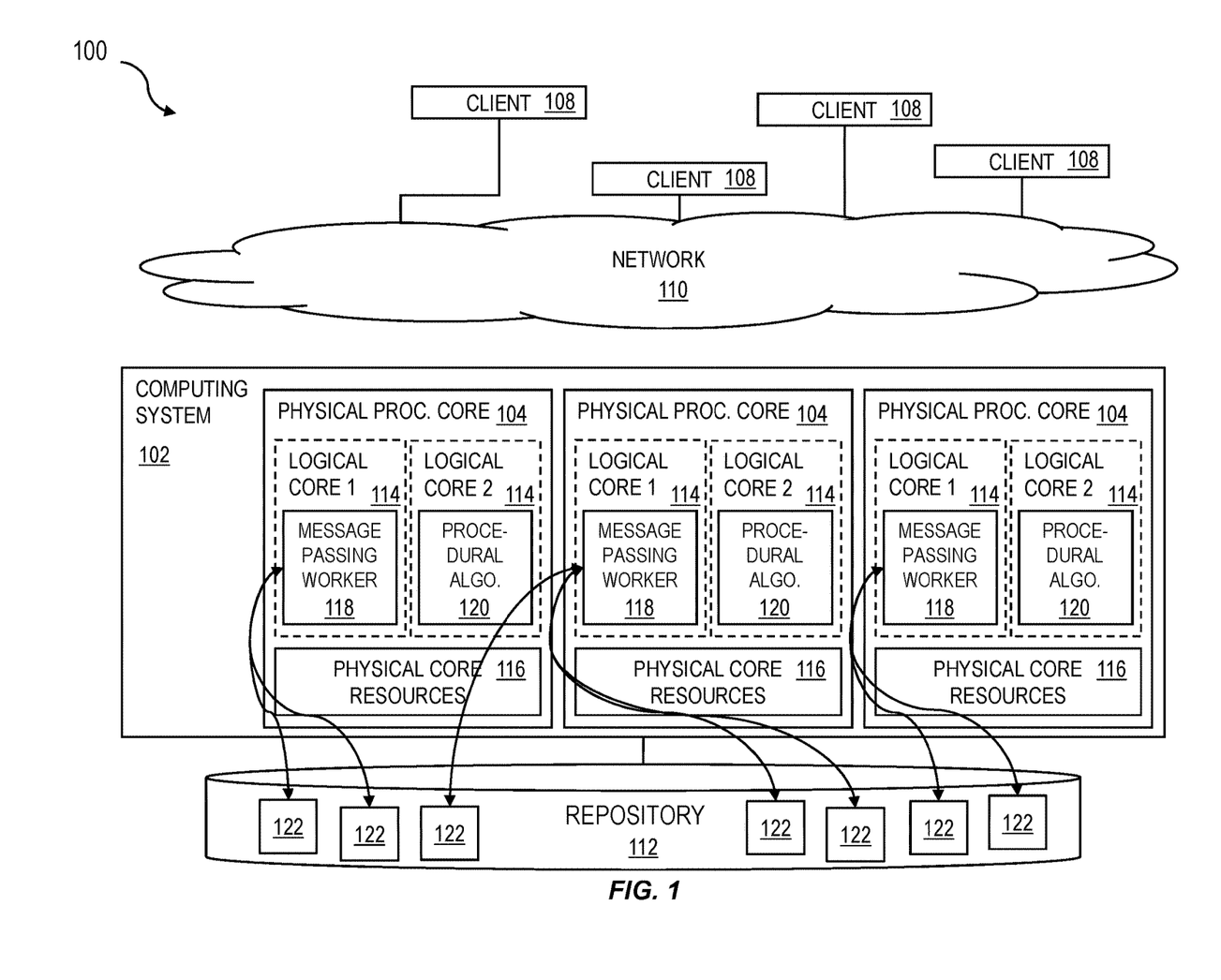
FIG. 1 is a diagram illustrating features of a database management system architecture consistent with at least some implementations of the current subject matter.

FIG. 1 shows a diagram 100 illustrating features of a computing system 102 that includes multiple physical processor cores 104 (also sometimes referred to herein as central processing units (CPUs)). While the computing system 102 is shown as a single, co-located system with multiple physical processor cores, distributed architectures or computing frameworks in which multiple systems each having one or more physical processor cores are linked or otherwise in communication are also within the scope of the current subject matter. The computing system 102 can be accessible by one or more client machines 108, either via a direct connection, a local terminal, or over a network 110 (e.g. a local area network, a wide area network, a wireless network, the Internet, or the like).

A repository (e.g., a database such as a relational database) 112 accessed by or maintained within the computing system 102 can store any kind of data (including objects in memory that are assigned to workers), potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like. The repository 112, in some cases, can be the memory (e.g., DRAM, etc.) of the system in that objects are in memory and are assigned to workers. Tables of the database or ranges within tables can be assigned to different database partitions that are assigned to different hosts, for example data distribution and/or scalability reasons. Such a configuration can be used for large, on-premise or stand-alone systems with high performance requirements. Each physical processor core 104 can support two (or optionally more) logical cores 114, which can share resources 116 of the physical core. As discussed above, the logical cores 114 of each physical processor core 104 can be divided between executing message-passing workers 118 and executing procedural algorithms 120. The repository includes database objects 122, which can include, but are not limited to tables, parts of tables, data objects, business objects, user interface objects, indexes, stored procedures, sequences, views, or other types of data structures for holding or reviewing data. Each database object 122 is assigned to a specific message-passing worker of the message-passing workers 118 supported on the various physical processor cores 104 of the computing system 102.

Figure 2:
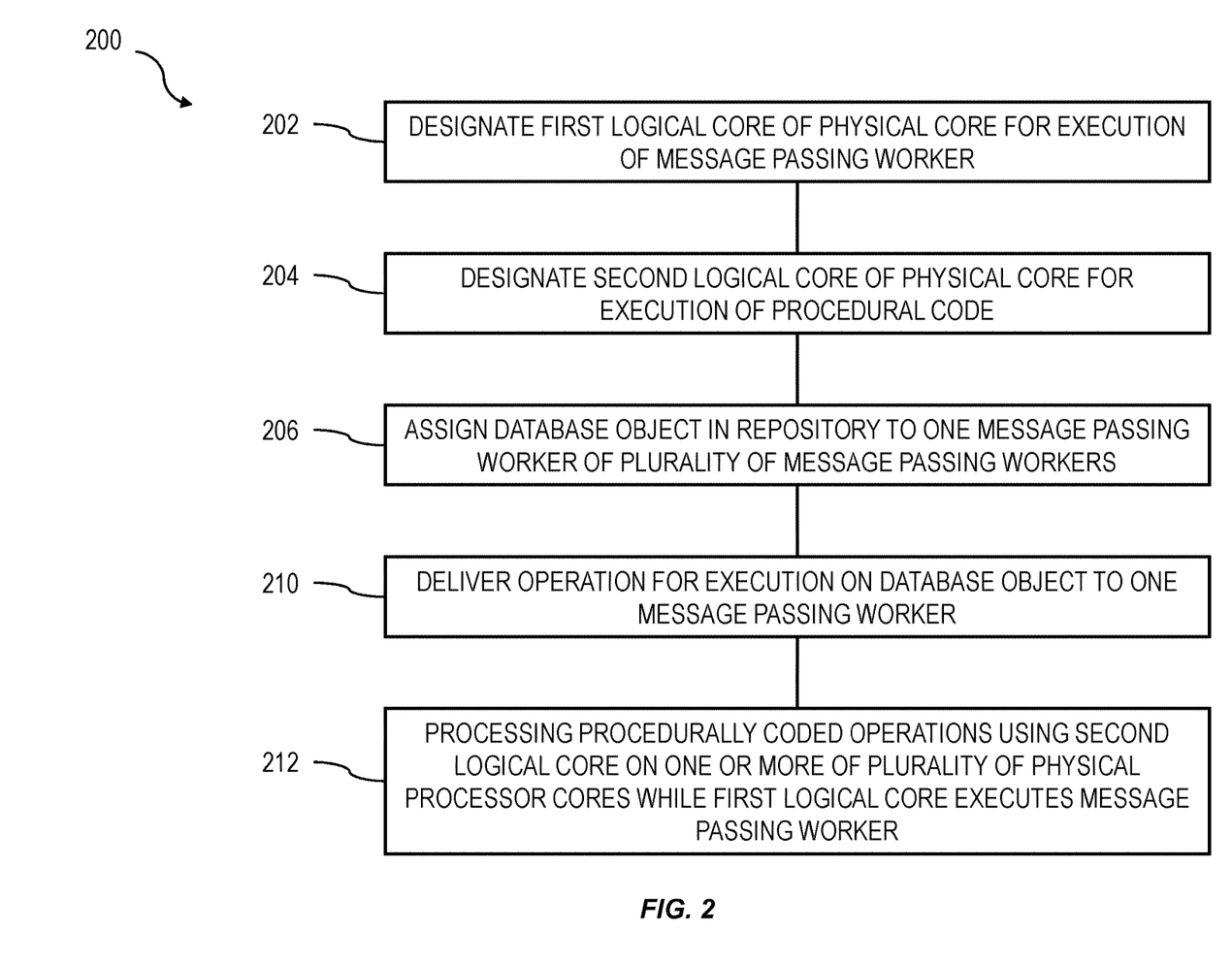
FIG. 2 is a process flow chart illustrating features of a method consistent with implementations of the current subject matter.

Consistent with a first aspect of the current subject matter, an example of which is illustrated in FIG. 1, a method as illustrated in the process flow chart 200 of FIG. 2 can include the use of physical processor cores capable of supporting simultaneous multi-threading, which is also referred to as hyper threading. At 202, a first logical core of a plurality of logical cores supported on each of a plurality of physical processor cores in a computing system is designated for execution of a message-passing worker of a plurality of message workers, and at 204, a second logical core of the plurality of logical cores supported on each of the plurality of physical processor cores is designated for execution of procedural code such that resources of a respective physical processor core supporting the first logical core and the second logical core are shared between the first logical core and the second logical core. At 206, a database object in a repository is assigned to one message-passing worker of the plurality of message-passing workers. At 210, an operation for execution on the database object is delivered to the one message-passing worker, while at 212 other, procedurally coded operations are processed using the second logical core on one or more of the plurality of physical processor cores. A plurality of database objects that includes the database object referenced at 206 can be assigned to the one message-passing worker, and each of the plurality of database objects can have its own register maintained by the message-passing worker to which the database object is assigned.

Approaches such as those described above can allow concurrent use in one database kernel of lock-based data operations as well as parallelized message-passing operations, and thereby improve the overall performance of a computing system implementing a database management system. Currently available approaches can support either lock-based or message-passing operations individually, but not in the same kernel. In some examples, table operations, which can generally be performed using a data manipulation language (DML), can be handled via message-passing workers. While significant improvements in parallel processing are possible with this approach, legacy database management systems with millions or more lines of procedural code are not readily converted. Implementations of the current subject matter can advantageously allow use of the more efficient parallel processing possible with message-passing while still supporting those parts of the code that are written procedurally. Procedural code can be heavily stream oriented. For example, data can be loaded from main memory so that a processing stream can be built from it. Such operations are typically less memory intensive, but do require significant processing resources. In contrast, DML operations can be more typically characterized as random access operations, for example in which access to discrete, separate parts of the memory are required (e.g., in writing a data dictionary). The efficiency of such operations can be largely drive by cache misses (e.g., if data needed for an operation are missing from the processor cache and therefore need to be loaded from main memory). However, DML operations may not require as much processor resources or bandwidth. Accordingly, sharing of the physical processor core resources between message-passing operations and procedural code execution as described herein can be advantageous.

In another aspect of the current subject matter, database objects can be mapped to message-passing workers for facilitating data access in a mixed-mode environment in which message-passing and mutual exclusion-based approaches (e.g. procedural coding) are used concurrently within a same database kernel.

As noted above, available logical cores in the computing system 102 (which can optionally include more than one discrete system) can be partitioned for use by message-passing workers and procedural code. Internal structures of a database object can be implemented as versioned objects, for example as described in co-pending U.S. application Ser. No. 13/770,901, filed Feb. 19, 2013 and entitled "Lock-free, Scalable Read Access to Shared Data Structures Using Garbage Collection," the disclosure of which is incorporated by reference herein in its entirety. The current subject matter can also be used in connection with the subject matter of co-pending U.S. application Ser. No. 14/062,749, filed Oct. 24, 2013 and entitled: "Coexistence of Message-Passing-Like Algorithms and Procedural Coding".

Consistent with implementations of the current subject matter, each database object (such as a table, part of a table, one or more table columns, other data structures, or the like) is assigned to a specific message-passing worker. Advantageously, this assignment remains fixed for a significant part of the database object's existence. The assigning of a database object to a specific message-passing worker also binds that database object to a single physical processor core and thereby can allow less re-reading of cached data. In cases in which a database object is being frequently operated upon, the chances of the cached data being re-usable are increased when the same physical processor core handles all operations for a given database object.

Operations modifying the database object can be posted into the message queue of the message-passing worker to which the database object is assigned. The operations in the message queue can then be performed sequentially by the assigned message-passing worker. Operations reading the database object can be executed directly by procedural code. Data consistency can be ensured using versioned objects and multi-version concurrency control (MVCC) to filter rows visible to a transaction. In this manner 100% scalability for the reader can be ensured.

Versioning of data objects, table control structures used by readers, etc. can include disallowing readers from acquiring locks on a data structure. Instead, a reader works with a current version of a data structure until a query or query plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.).

MVCC ensures transaction isolation and consistent reading. Each row of a database table can be associated with a unique, monotonically-increasing identifier (RowID). When a new version of the record is created, this new version can also become a new RowID. The old version of the record can also be kept for parallel readers and can be cleaned (e.g. marked for deletion) during garbage collection after a commit operation. Certain operations, like locking using embedded MVCC information, can be executed directly in a reader.

Figure 3:
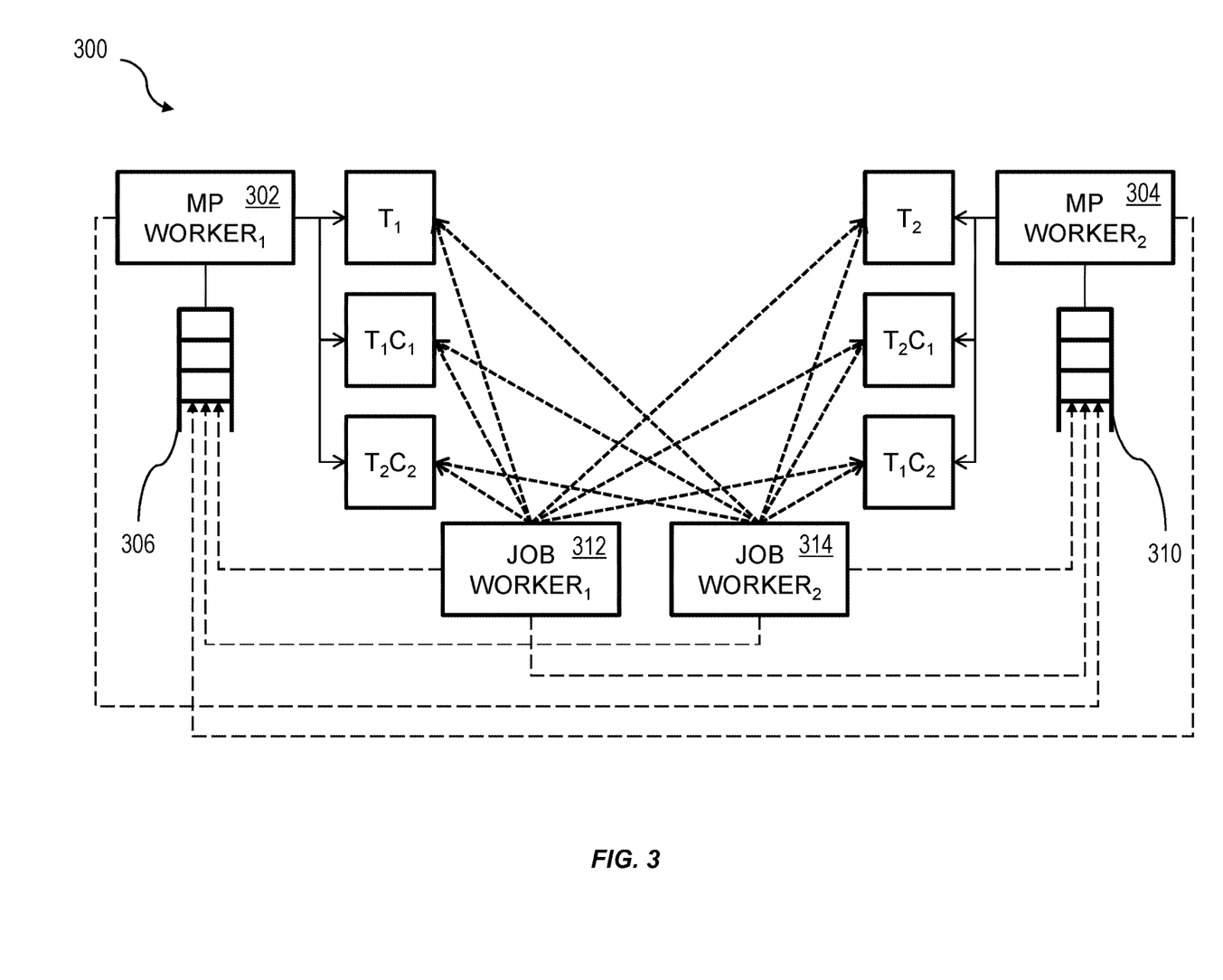
FIG. 3 is a diagram illustrating an example of handling of operations by message-passing workers and procedural code job consistent with at least some implementations of the current subject matter.

FIG. 3 shows a diagram 300 illustrating some features consistent with implementations of the current subject matter. Two message-passing workers 302, 304 are shown. As discussed above, the workers 302, 304 are supported on separate logical cores of physical processor cores of a computing system. Each message-passing worker 302, 304 has a message queue 306, 310. Also included in FIG. 3 are two job workers 312, 314, which can be supported on different separate logical cores than the message-passing workers 302, 304. Messages can be directed to a message queue 306 or 310 of a message-passing worker 302 or 304 by other message-passing workers or by job workers indicated by the dashed lines.

Each message-passing worker 302 or 304 can have exclusive write access to a set of database objects as designated by the solid arrows. For example, the first message-passing worker 302 can have exclusive write access to a first table ($T_1$), a first column in the first table ($T_1C_1$), and a second column in a second table ($T_2C_2$) while the second message-passing worker can have exclusive write access to a second table ($T_2$), a first column in the second table ($T_2C_1$), and a second column in the first table ($T_1C_2$). Overlap of data objects is possible as shown in FIG. 3 in that write access to a table can be available from one message-worker while write access to a column within that table can be available from another message-worker. The job workers 312, 314 can have read-only access to any of the data objects via versioned structures as indicated by the dotted lines. This read-only access can be via a dirty read with no locks.

Figure 4:
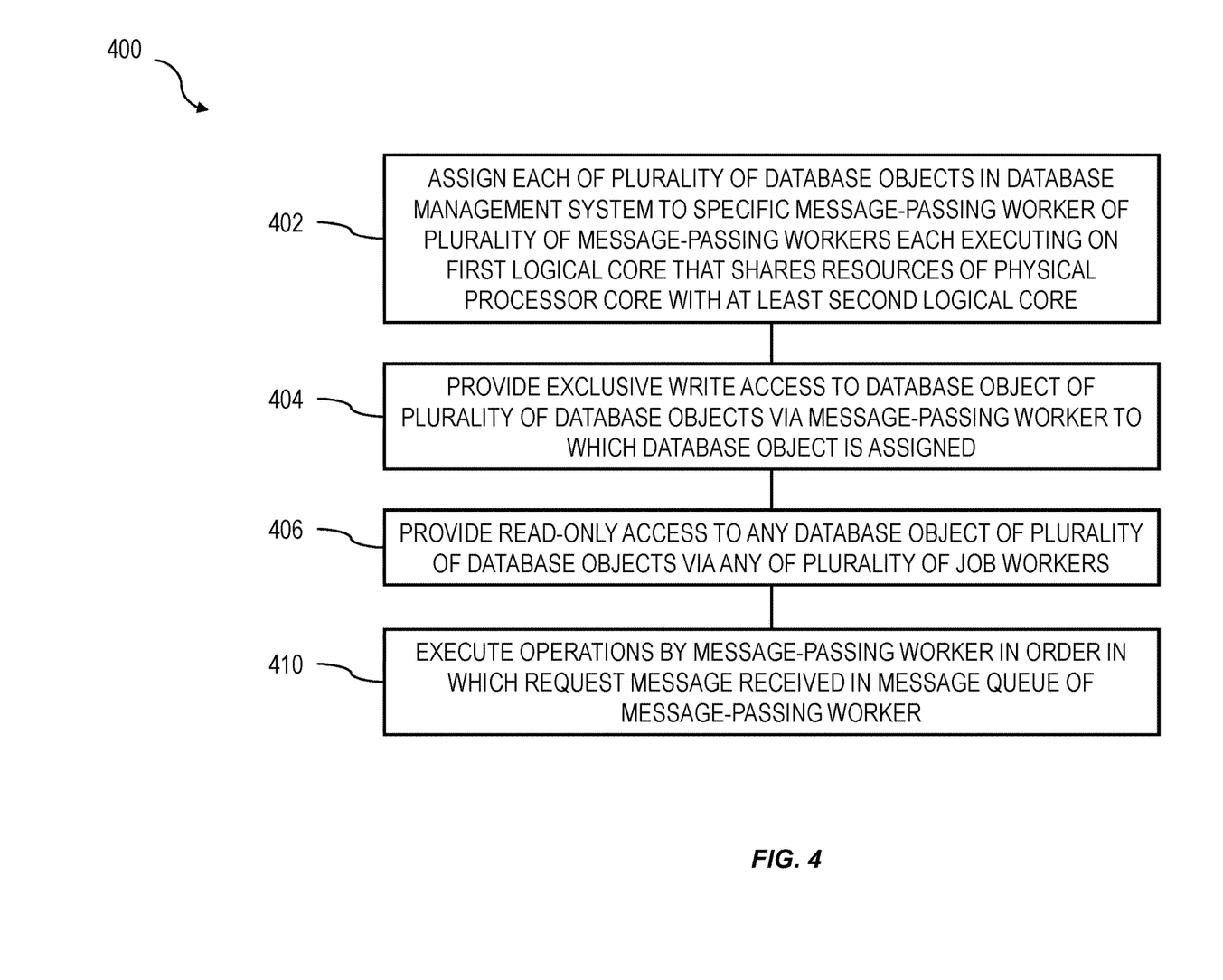
FIG. 4 is a first process flow chart illustrating features of a method consistent with implementations of the current subject matter.

FIG. 4 shows a process flow chart 400 illustrating features of a method consistent with implementations of the current subject matter. At 402, each of a plurality of database objects in a database management system is assigned to a specific message-passing worker of a plurality of message-passing workers. Each of the plurality of message-passing workers executes on a first logical core that shares with at least a second logical core one or more resources of a physical processor core of a plurality of physical processor cores. The second logical core executes a job worker of a plurality of job workers that implement procedural code. In other words, as discussed above, the physical processor cores of the computing system or systems each support SMT such that two or more logical cores share resources of each physical processor core. A first logical core of each physical processor core supports a message-passing worker and a second logical core of each physical processor core support a job worker that implements procedural code.

At 404, exclusive write access to a database object of the plurality of database objects is provided via a message-passing worker of the plurality of message-passing workers to which the database object is assigned. Read-only access to any database object of the plurality of database objects is provided via any of the plurality of job workers at 406. At 410, operations are executed by the message-passing worker in an order in which request messages are received in a message queue of the message-passing worker. In this manner, locking is not required to maintain exclusivity of write access to a database object, because all write operations on the database object occur via a single message-passing worker, and the worker performs requested operations sequentially according to its message queue.

Database objects can be assigned to specific message-passing worker in a random or round-robin fashion. Performance statistics can be maintained and monitored for each database object (such as, for example, one or more of access frequency, processor time spent, etc.) and each queue (such as, for example, queue length, etc.). A rebalancing operation can run periodically to reassign database objects for equalizing the load on individual message-passing workers. Various approaches to rebalancing can be applied. After rebalancing, it is possible that a message-passing worker may receive a request for an operation on a database object that is no longer assigned to the message-passing worker. In such a case, the receiving message-passing worker can post the request message into a proper message queue of a second message-passing worker that to which the database object is now assigned new owner (e.g. via a forwarding operation).

With a message-passing approach such as is described herein, in which a given database object can be assigned to a single message-passing worker that consistently effectively serializes operations on a single database object, locking of internal structures is not necessary to maintain concurrency. Furthermore, since a database object is accessed only from a single thread on a single logical core, improved data locality is provided, for example because the database object can be easily kept in physical processor-local memory in a non-uniform memory access system. Also, a hit rate for cached data can be improved. While procedural code running in parallel and handling other objects may degrade cache performance for message-passing workers, the overall effect is a net positive for many examples of typical database management system use cases.

As referenced above, message passing can represent binding (database) objects to worker threads executing operations on these objects on behalf of a requestor. That is, each (database) object (such as database table, a column, data dictionary, etc.) can be assigned to be accessed by exactly one worker thread. Any operation requests can then be queued and then executed serially by a worker thread. This eliminates all synchronization in the system beyond producer/consumer synchronization on queues used to pass messages between workers and between worker and external requestor.

Figure 5:
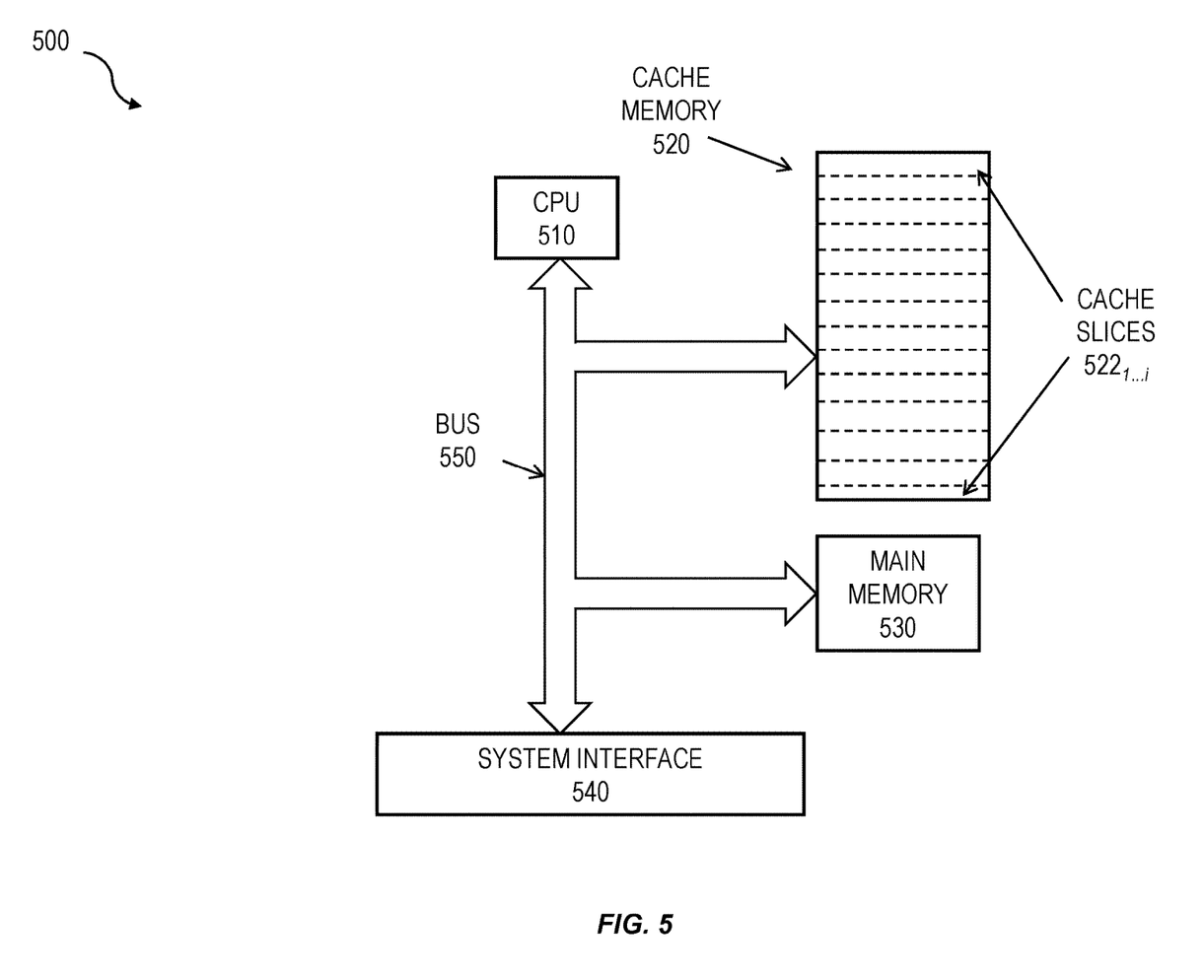
FIG. 5 is a diagram illustrating a computing CPU architecture including CPU memory having slices.

FIG. 5 is a diagram 500 illustrating a simplified diagram of a computing system in which a CPU 510 communicates with cache memory 520, main memory 530, and a system interface 540 via a bus 550. Every time the CPU 510 performs a read or write operation, the cache memory 520 can intercept the corresponding transactions. The cache memory 520 can offer cache slicing (which is also sometimes referred to as cache coloring) in which there are a plurality of separate and distinct portions of the cache memory that are referred to as slices $522_1 \ldots _i$. The slices $522_1 \ldots _i$ can be defined, for example, in a bitmask in a special register of the CPU 510. In addition, the slices $522_1 \ldots _i$ can be configured such that they only comprise a portion of the cache memory 520.

The current subject matter can use a slice allocation algorithm which selectively allocates the cache slices $522_1 \ldots _i$ to various operations and/or objects. For example, the slice allocation algorithm can be used to assign exclusive cache slices $522_1 \ldots _i$ to all or to "hottest" database objects on a particular worker thread. Exclusive in this regard means that no other operations/objects are able to use such cache slice $522_1 \ldots _i$.

In a first example, the CPU 510 includes cache memory 520 having 16 cache slices $522_1 \ldots _i$. In this particular case, there can be 14 objects associated with a particular worker thread. When the CPU 510 executes code for a particular object, one exclusive cache slice $522_1 \ldots _i$ as well as 2 shared cache slices $522_1 \ldots _i$ can be activated to cache data for the operation on this object.

In a second example, the CPU 510 includes cache memory 530 having 16 cache slices $522_1 \ldots _i$ and 20 objects associated with a particular worker thread. Using a slice allocation algorithm, 10 of the objects are considered hot. When executing code for a hot object, one exclusive slice $522_1 \ldots _i$ plus 6 cache slices $522_1 \ldots _i$ can be activated. When executing code for a cold object, only 6 shared slices $522_1 \ldots _i$ can be activated.

Figure 6:
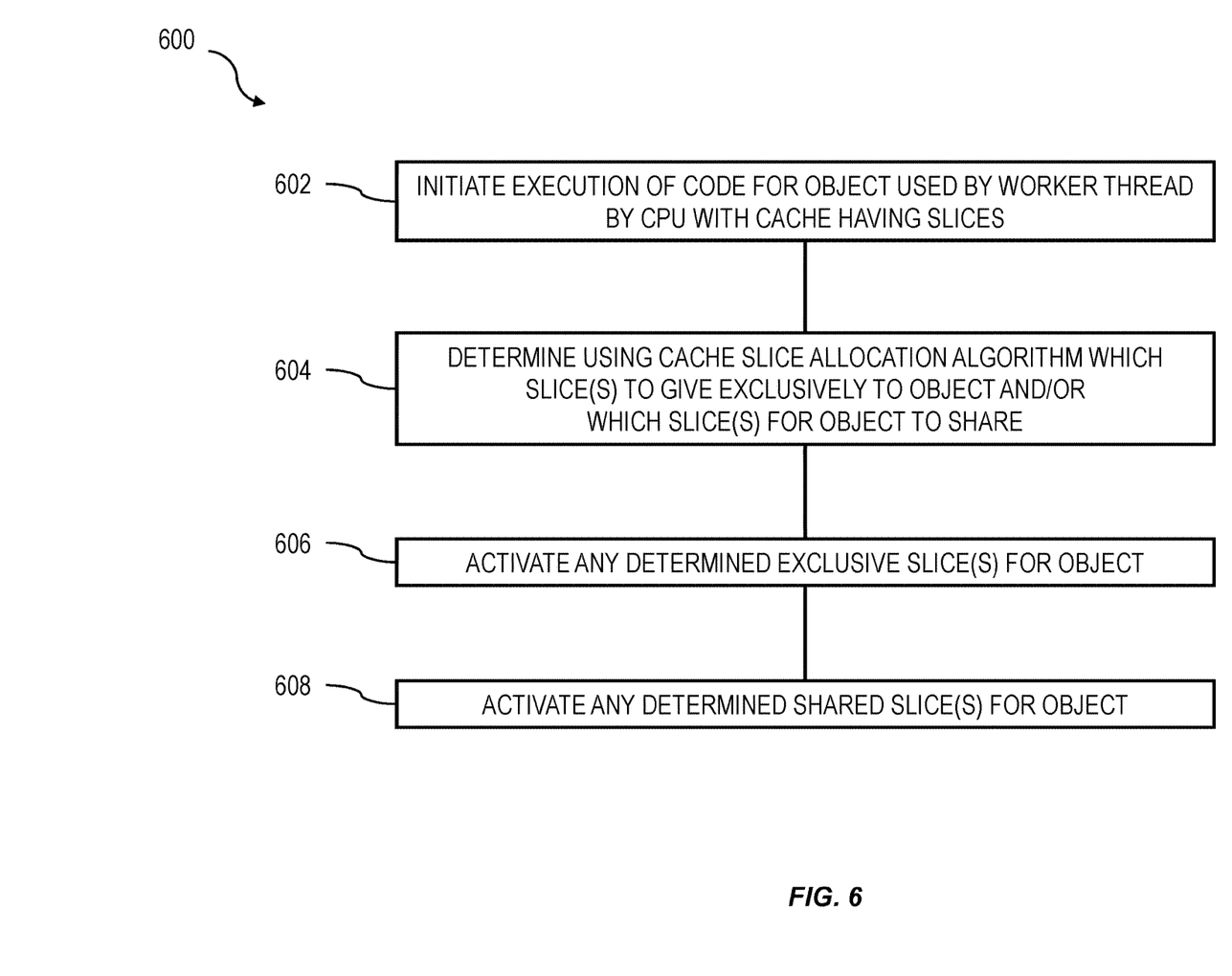
FIG. 6 is a second process flow chart illustrating features of a method consistent with implementations of the current subject matter.

FIG. 6 is a process flow diagram 600 in which, at 602, at CPU (which forms part of a computing device), initiates execution of code associated with each of a plurality of objects used by a worker thread. The CPU has an associated cache that is split into a plurality of slices. Subsequently, at 604, it is determined, by a cache slice allocation algorithm for each object, whether any of the slices will be exclusive to or shared by the object. Next, at 606, for each object, any slices determined to be exclusive to the object are activated such that the object exclusively uses such slices. In addition, at 608, for each object, any slices determined to be shared by the object are activated such that the object shares or is configured to share such slices.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method comprising:
designating, by a central processing unit (CPU) comprising a first physical processor core including a first logical core and a second logical core, the first logical core for execution of a message-passing worker thread, wherein the first physical processor core includes resources shared by the first logical core and the second logical core;
designating, by the CPU, the second logical core for execution of procedural code of a job worker thread;
assigning, by the CPU, a database object to the message-passing worker thread;
delivering, by the CPU and to the message-passing worker thread, a modifying operation of the database object for execution by the message-passing worker thread, wherein the message-passing worker thread has exclusive write access to a set of database objects including the database object, wherein overlap of designation of one or more database objects in the set of database objects exists between the message-passing worker thread and another message-passing worker thread; and
processing, by the CPU, procedurally coded operations of the job worker thread using the second logical core while the first logical core executes the modifying operation of the database object using the message-passing worker thread, wherein the execution of the modifying operation is based on order of receipt in a message queue associated with the first logical core, wherein read-only access of a current version of the database object, by the executing procedural code of the job worker thread, is allowed during the execution of the modifying operation.

2. The method of claim 1, wherein, during the execution of the modifying operation, a reader is disallowed from acquiring a lock on the database object.

3. The method of claim 1, further comprising:
associating each row of the database object with a unique identifier;
associating each version of the database object with a new identifier, different than the unique identifier for each row of the database object; and
maintaining an old version of the database object for parallel read operations.

4. The method of claim 1, further comprising implementing load balancing amongst the message-passing worker thread and a plurality of other message-passing worker threads that reside in other physical processor cores of the CPU.

5. A system comprising:
a central processing unit (CPU) comprising a first physical processor core including resources shared by a first logical core and a second logical core executing on the first physical processor core; and
memory storing instructions which, when executed by the CPU, result in operations comprising:
designating the first logical core for execution of a message-passing worker thread;
designating the second logical core for execution of procedural code of a job worker thread;
assigning a database object to the message-passing worker thread;
delivering a modifying operation of the database object for execution to the message-passing worker thread, wherein the message-passing worker thread has exclusive write access to a set of database objects including the database object, wherein overlap of designation of one or more database objects in the set of database objects exists between the message-passing worker thread and another message-passing worker thread; and
processing procedurally coded operations of the job worker thread using the second logical core while the first logical core executes the modifying operation of the database object using the message-passing worker thread, wherein the execution of the modifying operation is based on order of receipt in a message queue associated with the first logical core, wherein read-only access of a current version of the database object, by the executing procedural code of the job worker thread, is allowed during the execution of the modifying operation.

6. The system of claim 5, wherein, during the execution of the modifying operation, a reader is disallowed from acquiring a lock on the database object.

7. The system of claim 5, wherein execution of the instructions by the CPU further results in operations comprising:
associating each row of the database object with a unique identifier;
associating each version of the database object with a new identifier, different than the unique identifier for each row of the database object; and
maintaining an old version of the database object for parallel read operations.

8. The system of claim 5, wherein execution of the instructions by the CPU further results in operations comprising implementing load balancing amongst the message-passing worker thread and a plurality of other message-passing worker threads that reside in other physical processor cores of the CPU.

9. A non-transitory computer program product storing instructions which, when executed by a central processing unit (CPU) comprising a first physical processor core including resources shared by a first logical core and a second logical core executing on the first physical processor core, result in operations comprising:

designating the first logical core for execution of a message-passing worker thread;

designating the second logical core for execution of procedural code of a job worker thread;

assigning a database object to the message-passing worker thread;

delivering a modifying operation of the database object for execution to the message-passing worker thread, wherein the message-passing worker thread has exclusive write access to a set of database objects including the database object, wherein overlap of designation of one or more database objects in the set of database objects exists between the message-passing worker thread and another message-passing worker thread; and     processing procedurally coded operations of the job worker thread using the second logical core while the first logical core executes the modifying operation of the database object using the message-passing worker thread, wherein the execution of the modifying operation is based on order of receipt in a message queue associated with the first logical core, wherein read-only access of a current version of the database object, by the executing procedural code of the job worker thread, is allowed during the execution of the modifying operation.

10. The non-transitory computer program product of claim 9, wherein, during the execution of the modifying operation, a reader is disallowed from acquiring a lock on the database object.

11. The non-transitory computer program product of claim 9, wherein execution of the instructions by the CPU further results in operations comprising:

associating each row of the database object with a unique identifier;

associating each version of the database object with a new identifier, different than the unique identifier for each row of the database object; and     maintaining an old version of the database object for parallel read operations.

12. The non-transitory computer program product of claim 9, wherein execution of the instructions by the CPU further results in operations comprising implementing load balancing amongst the message-passing worker thread and a plurality of other message-passing worker threads that reside in other physical processor cores of the CPU.

* * * * *